Figure 1:
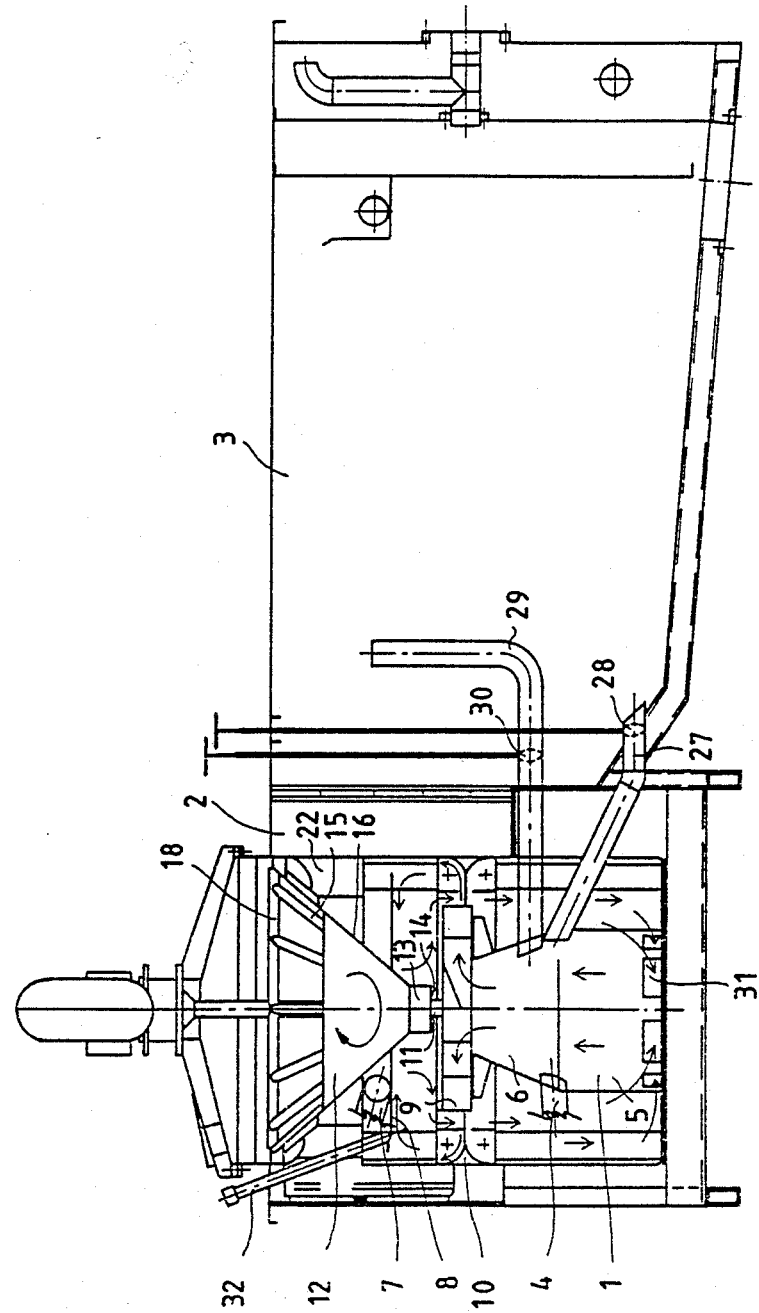

United States Patent [19]

Nyman et al.

[11] Patent Number: 4,747,694
[45] Date of Patent: May 31, 1988

[54] METHOD FOR DISPERSING TWO PHASES IN A SOLVENT EXTRACTION PROCESS AND A PUMP MIXER FOR REALIZING THE METHOD

[75] Inventors: Bror G. Nyman, Ulvila; Stig-Erik Hultholm, Pori; Launo L. Lilja, Pori; Valto J. Mäkitalo, Pori, all of Finland

[73] Assignee: Outokumpu Oy, Helsinki, Finland

[21] Appl. No.: 930,727

[22] Filed: Nov. 13, 1986

[30] Foreign Application Priority Data

Nov. 28, 1985 [FI] Finland ................... 854725

[51] Int. Cl.$^4$ ................................. B01F 3/08
[52] U.S. Cl. .................... 366/265; 366/136; 366/348
[58] Field of Search ............... 366/262, 263, 267, 265, 366/279, 136, 137, 154, 165; 422/227, 225, 228, 259, 258

[56] References Cited

U.S. PATENT DOCUMENTS

| | | | |
|---|---|---|---|
| 905,025 | 11/1908 | Trent | 366/265 |
| 2,180,301 | 11/1939 | Saylor | 366/265 |
| 4,235,602 | 11/1980 | Meyer et al. | 422/228 X |
| 4,251,502 | 2/1981 | Forster | 422/228 X |
| 4,358,206 | 11/1982 | Schutte | 366/262 |
| 4,628,391 | 12/1986 | Nyman et al. | 366/265 |

FOREIGN PATENT DOCUMENTS 2024645 1/1980 United Kingdom .

OTHER PUBLICATIONS

The Outokumpu Mixer-Settler System: A New Design Concept with Improved Scale-Up Characteristics; Nyman et al., TMS Technical Paper, No. A87-13, 10/1987.
Chemical Engineer's Handbook; Perry, pp. 1216–1219, 1941.

*Primary Examiner*—John Petrakes
*Assistant Examiner*—Katherine Matecki
*Attorney, Agent, or Firm*—Brooks, Haidt, Haffner & Delahunty

[57] ABSTRACT

The invention relates to a method for dispersing the two liquid phases of a solvent extraction process well together, for controlling the desired type of dispersion and for raising the created dispersion to a level essentially higher than the liquid surface in the mixing tank. In the apparatus of the invention, to the circulation cylinder (6) of the mixer there is connected the heavy phase return conduit (27) and the light phase return conduit (29) entering from the settler of the same extraction step. In the top part of the mixer, coaxially with the turbine pump (9), there is installed the dispersion pump (12) where the dispersion rises to above the liquid surface (8) of the mixer through 2-24 rising pipes (15). The top ends of the rising pipes (15) are connected to the circular pipe (18), wherefrom the dispersion flow is conducted to the next stage through the collecting trough (22).

12 Claims, 3 Drawing Sheets

METHOD FOR DISPERSING TWO PHASES IN A SOLVENT EXTRACTION PROCESS AND A PUMP MIXER FOR REALIZING THE METHOD

The present invention relates to a method for dispensing the two phases of a solvent extraction process with each other by means of intensified vertical circulation and simultaneously to a method for raising the dispersion to a level essentially higher than the liquid surface of the mixing tank in order to make it easier for the extraction phases to flow from one extraction step to another. The invention also relates to an apparatus for realizing the method.

In the prior art there is known U.S. Pat. No. 4,628,391 granted Dec. 9, 1986 to Nyman et al., where in dispersing there is utilized a vertical circulation flow, which circulation flow is created by employing a turbine pump. The essential feature of the method and apparatus is that the placing of the turbine pump within the contactor is dependent upon which of the two liquid phases is desired as the continuous phase in the dispersion. If it is desired that the lighter phase be kept continuous, the turbine pump is placed in the top part of the contactor. On the same level with the turbine, the contactor circumference is provided with a division ring. When the turbine is placed in the top part of the contactor, the division ring is fitted so that it turns the turbine jet mainly downwards, in which case the direction of the flow is again changed at the bottom of the contactor, wherefrom the flow rises upwards through the suction cylinder. The inclination of the dispersion to flow downwards is further improved by aid of a closing disc located above the turbine pump. The dispersion discharged from the contactor rises to the baffle plate located above the closing disc and further as an overflow into the settler. If the turbine is placed in the bottom part of the contactor, it is necessary to considerably increase the rotational speed of the turbine in order to make the lighter liquid phase to flow into the circulation cylinder. In order to maintain the dispersion, it is essential to employ the closing disc. Owing to the turbine and the closing disc, the top part of the contactor belongs to the mixing area, but there is not created any specific flow pattern.

Another prior art practice is introduced in the U.S. Pat. No. 4,235,602, wherein a cone pump installed in the top part of the mixer raises the dispersion up from the mixer. The mixer in question avails of conventional mixing techniques, where the turbine rotates near the bottom. There are not provided any structures for the guiding the turbine jet, but the turbine rotates at a speed which is high enough to cause a sufficient turbulence also in the top part of the mixer. The dispersion is discharged from the mixer via a stationary cone installed in the middle of the mixer. Inside the cone there are placed three blades which are attached to the turbine axis. Rotated by the cone blades, the dispersion rises and is pressed against the stationary cone surface, in which case the movement of the dispersion located in the vicinity thereof is slowed down, and as a consequence the rising of the surface level within the cone is also slowed down. Now part of the liquid contained in the dispersion to be raised has an angular velocity different from the rest, and this brings about shearing forces which tend to diminish the size of the droplets. The rising angle of the cone described in the said patent publication is steep, roughly 80° according to the drawings, and this undoubtedly makes the raising of the dispersion more difficult. In comparison with the mixer, the diameter of the employed turbine is short—less than ⅜ of the diameter of the mixer according to the drawings—wherefore the speed of rotation has to be fairly high in order to maintain a permanent dispersion and to achieve the required height for the raising.

In the method of the present invention for dispersing solvent liquids, and in the apparatus designed for realizing to method, the aforementioned disadvantages have been obviated. The method of dispersion of the present invention is based on an intensified vertical circulation of the dispersion, resembling a double loop in form. Moreover, it is substantial that by utilizing the dispersion pump attached to the axis of the turbine mixer, the dispersion can be raised to a level essentially higher that the liquid surface in the mixer, and therefrom the dispersion flows further into the presettler and into the settler, where the liquid surface is likewise higher than in the mixer.

It is well-known in the art that industrial scale liquid-liquid extraction processes usually proceed in several successive stages, each extraction stage normally containing a mixer and a settler, and possibly a pre-settler. See, for example, Perry, Chemical Engineers' Handbook, Se Edition, pages 1216–1219. The mixer settler units can be called cells. By employing this application, the separate pumping of the liquid phases between the extraction cells is avoided. The method and the apparatus are also characterized by the return conduits for the lighter and the heavier phases from the settler of the same step in order to control the desired type of dispersion.

According to the present invention, the mixing member is placed in the middle of the mixing tank or above it, and the dispersion of the phases which are fed into the mixing tank through the circulation cylinder is improved by directing the turbine jet upwards. The dispersion flows from the top between the turbine jets downwards, turns at the bottom of the mixing tank and rises, via the separate middle part of the mixing tank up to below the mixing member. Thus conducting of the extraction reactions, i.e. the extraction step efficiency, is improved by means of lengthening the circulation of the flow, which now assumes a double-loop form resembling the character eight. In the large-size mixers with a conventional mixing system there is a disturbing amount of classification of the liquid phases in the top and bottom parts of the mixer. By employing the vertical circulation described above, the dispersion is well handled in the bottom part of the mixing tank, but it has now been realized that a dispersion jet sprayed from the mixing member located in the top part of the mixing tank, which dispersion jet is directed to assume a circular flow via an upper loop bend, is ideal for maintaining the top part of the mixing tank in dispersion, too. Owing to the clear flow pattern thus created, the mixer rotational speed can be further slowed down, which reduces the danger of emulsification.

The solution flow limitations between the separate extraction steps are eliminated by conducting the dispersion, formed of the extraction phases by means of flow circulation, to above the mixing member, divided at least into two separate sub-flows starting from the middle of the mixing tank, up to a level essentially higher than the surface of the liquid contained in the mixing tank. When carried out according to the present invention, the raising of the dispersion does not lead to emulsification-on the contrary, it has been observed that a partial classification of the liquid phases takes place. While the sub-flows are made to ascend, they are also made to rotate at the same speed as the mixing member. When the desired height is achieved, the dispersion rising in sub-flows is made to change direction so as to be tangential with respect to the rotation, in which case the sub-flows burst out in a symmetrical ring, where the centrifugal force causes a partial classification of the phases. Now the sub-flows partly collide, and at the same time their flow speed is decreased. From the circle-shaped flow the dispersion is made to proceed, as flexibly as possible, into the space located below and outside of the ring, which space as a whole is still located above the level of the liquid surface in the mixing tank, and from there the dispersion is conducted into the next stage.

As was already said before, it is essential, as regards the raising of the dispersion, that the dispersion be treated gently, so that the danger of emulsification does not arise. In this method it is not necessary, in order to disperse the liquid phases, to use a high mixing intensity, because a good dispersion is achieved by aid of the double-loop circulation, and the created dispersion can be raised to the desired level without the droplet size of the dispersion being essentially reduced.

Generally in an extraction process it is advantageous that if necessary, the lighter liquid phase can be maintained as the continuous phase, in which case the heavier phase is dispersed therein. The placing of the mixing member on the same level with the light liquid phase enables this, as is pointed out in U.S. Pat. No. 4,628,391. In addition to this, in order to secure the arrangement, it is advantageous to direct from the settler section of the same extraction step a slight return flow of both the lighter and particularly of the heavier phase into the mixer section, so that the phase ratio in a start-up situation remains correct, and that the desired liquid phase is obtained as the continuous phase.

Figure 2:
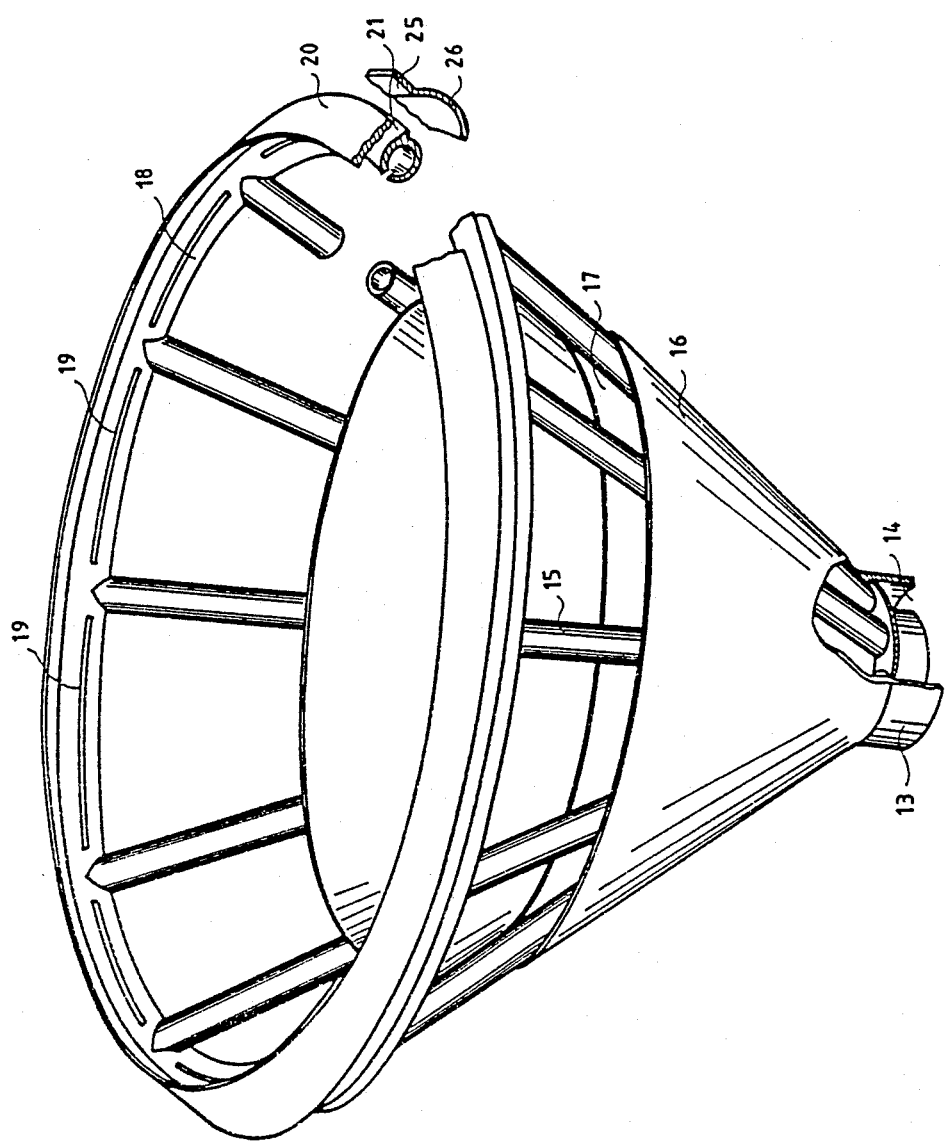
Figure 3:
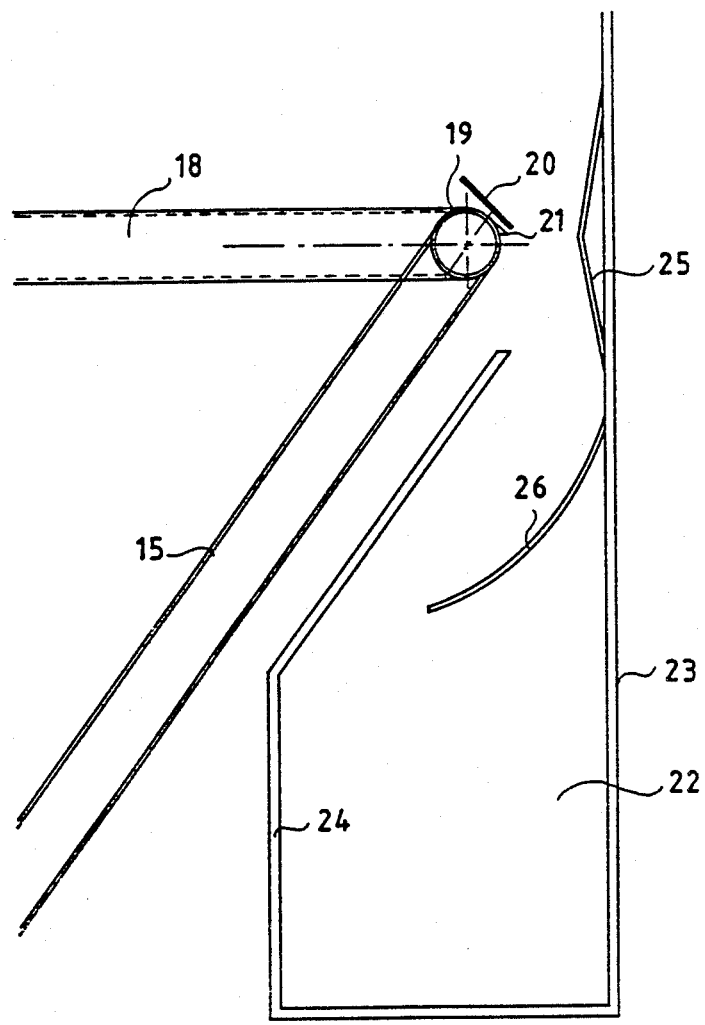

In the following the invention is described in more detail with reference to the appended drawings, where FIG. 1 is a cross-sectional illustration of the mixer of the invention as well as of the presettler and settler installed around the mixer, FIG. 2 is an axonometric illustration of the dispersion pump in partial cross-section, and FIG. 3 is a cross-sectional illustration of the top part of the mixer.

According to FIG. 1, the extraction cell comprises the mixer 1, the presettler 2 and the settler 3. The solvent liquids to be dispersed are introduced into the mixer so that the heavier liquid phase is brought, along the conduit 4, to the circulation cylinder 5 located in the bottom part of the mixer, and advantageously to the upwards narrowing conical top 6 of the said circulation cylinder 5, and the lighter liquid phase is brought along the conduit 7 to the top part of the mixer, i.e. to its liquid surface 8. The dispersing of the liquid phases takes place above the circulation cylinder, and by aid of the turbine pump 9 located, with respect to the mixer as a whole, in the middle or top part thereof. The turbine pump is advantageously of the type described in U.S. Pat. No. 4,628,391. Inside the mixer, on the circumference thereof, there is installed the division ring 10 at the same height with the turbine so that the division ring 10 turns the turbine jet mainly upwards, whereby the double-loop circulation of the dispersion, marked with arrows in the drawing, is created.

In order to make the mixer work, even with a high solution flow capacity, at a mixing intensity which is smoother and at the same time lower in average, the mixer is provided, in addition to the turbine pump 9, with a dispersion pump 12 which is installed in the top part of the mixer, on the same axis 11 with the turbine pump 9. The purpose of the dispersion pump is to raise the dispersion to an essentially higher level than the liquid surface in the mixer, because in the presettler 2 and in the settler 3, the liquid surface is also clearly above the liquid surface of the mixer. The dispersion pump 12 rotates at the same speed as the turbine pump. The suction inlet 14 of the suction cylinder 13 of the dispersion pump 12 is located fairly close to the turbine, above its middle but below the liquid surface. The rising pipes 15 belonging to the dispersion pump are seated in the suction cylinder, which is tightly closed at the top. The rising pipes are positioned so that they form an upwards widening cone, and around the rising pipes at their bottom ends, particularly below the liquid surface, there are fitted the cone plates 16 and 17, which are seen in more detail in FIG. 2. At their tops, the cone plates extend at least to the same level with the liquid surface 8 of the mixer. The cone plates rotate at the same speed as the rising pipes.

The ascending angle of the rising pipes is chosen according to the size of the apparatus and the speed of rotation; advantageously it ranges between 30°-60°. The number of the rising pipes is not critical and it can be freely chosen for instance between 2-24. The diameter of the rising pipes is chosen so that the flowing speed in the pipes remains relatively low, between 0.1 to 0.5 m/s.

Within this area, the turbulence caused by the flowing is normally so slight that pumping does not reduce the size of the average droplet.

In the preferred embodiment described here, the rising pipes are straight, but some other form is possible as well—on condition that the form does not give the dispersion to be pumped an expulsive force which is either to weak or too strong. When measured correctly, the raising height of the dispersion pump is such that it maintains the mixer surface so low (=raises the dispersion so high) that a light liquid phase from the collection trough of the adjacent cell flows onto the mixer surface without a separate pumping, and similarly the heavy liquid phase flows into the circulation cylinder to below the turbine.

The rising pipes 15 lead the dispersion directly into the circular pipe 18 which connects the rising pipes. The circular pipe, which rotates with the dispersion pump serves as a centrifuge separating the solution phases, and within the circular pipe the flowing is attenuated because the sub-flows from the rising pipes partly collide. In FIGS. 2 and 3 it can be observed more accurately that the dispersion is discharged from the circular pipe 18 via the horizontal slot 19 which is located inside the circular pipe, at 20°-40° with respect to the highest point of the pipe. The horizontal slot 19 does not necessarily have to be uniform, but instead of one uniform slot there may be several minor slots placed in the pipe area which remains in between the rising pipes, as is illustrated in FIG. 2.

At an inclined position above the circular pipe, there is installed the annular plate 20 which goes round the circular pipe and makes the dispersion discharged from the circular pipe to flow between the said annular plate 20 and the circular pipe. At the outer edge of the circular pipe 18 there is also fitted the downwards slanted threshold 21, the outer surface whereof is parallel to the annular plate. The purpose of the narrow threshold 21 is to make the dispersion flow become apart from the circular pipe. The annular plate and the threshold are matched so that they direct the dispersion leaving the circular pipe downwards at an angle of roughly 45°.

From the circular pipe 18, the dispersion flows into the top area of the mixer, into the dispersion collecting trough 22 surrounding the said top area. The bottom surface of the collecting trough is clearly above the liquid surface 8 of the mixer. The outer surface 23 of the collecting trough also serves as the cylinder surface of the mixer. The inner surface 24 of the trough can be designed for example so that at the bottom it is parallel to the outer surface and at the top parallel to the rising pipes 15 of the dispersion pump. In addition to this, according to another advantageous embodiment of the invention, there is formed a surface 25, inclined from the outer surface of the trough towards the inside in order to receive the dispersion, the bottom part of which surface 25 continues as an inwards curved braking surface 26. As was already pointed out, a flexible and gentle treatment of the dispersion is important in order to avoid the danger of emulsification and therefore the construction comprises the slanted surface 25 which the dispersion free of the circular pipe hits at a gentle angle. The braking surface 26 is used for slowing down the dispersion flow, because while flowing along this surface the dispersion is bound to proceed against the still effective centrifugal force. If the extraction reaction is slow, the braking surfaced may be omitted, and in that case the collecting trough functions as a continuation of the mixed, because while already in the trough, the dispersion is still in a whirling motion. From the collecting trough the dispersion flows further into the presettler and the settler, which are advantageously of the type described in the GB Pat. No. 2 024 645.

As is seen in FIG. 1, the dispersing apparatus is also provided with the return conduits from the settler of the same extraction step, i.e. with the heavier phase return conduit 27 furnished with valves 28, and with the lighter phase return conduit 29 furnished with valves 30. The return flows are conducted into the conical part 6 of the circulation cylinder. The heavy phase return conduit 27 is always employed in the start-up situations. The heavy phase return connected to the operation of the dispersion pump secures that the double-loop circulation, essential for the mixer operation, is started. Differences in specific weights between the solutions may cause a situation where some of the light phase exists in the top part of the mixer and some of the heavy phase at the bottom, and the said incompletely mixed zones may function as obstacles preventing the mixer circulation from starting up. Thus the dispersion pump raises relatively more of the light phase into the settler, wherefrom part of the heavy phase returns along the return conduit into the mixer. After a short operation period, a sufficient amount of the heavy solution phase rises into the mixer turbine via the circulation cylinder, so that the double-loop circulation can be started. It is recommended that a slight heavy phase return is continuously kept going by aid of the valve 28.

The light phase return conduit 29 can be be employed if necessary in cases when it is desired that the heavy phase be dispersed into droplets. When the raising height of the dispersion pump 12 as well as its pumping capacity are sufficient, the liquid surface in the mixer sinks so low that the return flow of the light phase can also be carried out successfully. Another effective factor is the constriction caused by the conical top part 6 of the circulation cylinder, the said constriction leading to the condition of low pressure within the circulation cylinder. It is advantageously to supply all solution injections to the top part of the cylinder in particular. The cross-sectional area of the circulation cylinder is suitably 0.2 to 0.6 times as large as that of the mixer. When the dispersion flows downwards in the double-loop circulation, the dispersion is conducted into the circulation cylinder 5 through apertures 31 placed in the immediate adjacency of the bottom of the circulation cylinder.

When neutralizing additions are supplied directly into the mixer, the required measuring sensors 32, such as the pH and other electrodes, are advantageously placed in the top part of the mixer, to hit the vigorously upwards turning turbine jet. Thus, installed within the primary jet, the electrodes are best kept clean and render more accurate measuring results.

What is claimed is:

1. A method for dispersing two liquid phases in a solvent extraction process, providing that a selected one of said liquid phases is a continuous phase, and raising a dispersion created to a higher level than a surface level of liquid in a mixing tank in which the phases are mixed, comprising causing most of a dispersion jet from a mixing member located no lower than the middle of the mixing tank to turn upwards and causing the dispersion to flow downwards at an outer circumference of the mixing tank below the mixing member and then turning that downward flow upwards from the bottom of the mixing tank through a central portion of the mixing tank; conducting a return flow of a desired phase into the mixing tank below the mixing member from a settler associated with said mixing tank; and removing the dispersion from the mixing tank by causing the dispersion to rise to a higher level than said liquid surface level in the mixing tank, dividing said dispersion flowing to a higher level into at least two rotating sub-flows, then causing the dispersion to turn and to assume a direction tangential to the direction of rotation of said sub-flows so that centrifugal force causes a partial classification of the phases, and conducting the dispersion as a thin layer to a next stage of the extraction.

2. The method of claim 1 wherein a heavy phase is conducted as a return flow from the settler to the mixing tank during start-up of the process to create a double-loop circulation.

3. The method of claim 1 wherein said return flow is a continuous flow of a heavy phase.

4. The method of claim 1 wherein said dispersion flowing to a higher level is divided into from 2 to 24 sub-flows.

5. The method of claim 1 wherein the flow rate of the sub-flows is from 0.1 to 0.5 meters per second.

6. Apparatus for dispersing two liquid phases in a solvent extraction process, for providing that a selected one of said liquid phases is a continuous phase, and for conducting a dispersion to a next stage of the extraction process, comprising: a mixer; a circulation cylinder at the bottom of said mixer; a turbine pump located above said circulation cylinder; a division ring; a presettler surrounding said mixer; and a settler; a heavy phase return conduit and a light phase return conduit for conducting liquid from the settler to a top part of the circulation cylinder for controlling which phase is continuous and for creating a double-loop circulation; a dispersion pump mounted coaxially with and above said turbine pump; said dispersion pump comprising a suction cylinder which suction cylinder is closed at the suction cylinder top, and which suction cylinder has a suction inlet located above the middle of the turbine pump; at least two rising pipes seated in said suction cylinder and extending upwardly and outwardly; cone plates around said rising pipes, bottom ends of said cone plates extending below a surface level of liquid in the mixer; said rising pipes terminating in an interconnecting circular pipe; and means for conducting dispersion from said circular pipe to a next extraction stage via a collecting trough positioned above said surface level of liquid in the mixer.

7. The apparatus of claim 6 wherein the circular pipe has at least one horizontal slot at a radially inner side of said circular pipe, said at least one slot being displaced by 20 and 40 degrees from the upper surface of the circular pipe.

8. The apparatus of claim 6 and including a narrow, downwards inclined threshold at an outer edge of said circular pipe.

9. The apparatus of claim 6 and including an annular plate arranged in an inclined position above the circular ring.

10. The apparatus of claim 6 wherein an inwards protruding slanted surface extends from an outer wall of said collecting trough.

11. The apparatus of claim 10 wherein a bottom part of said slanted surface is formed as an inwards curved braking surface.

12. The apparatus of claim 6 wherein there are from 2 to 24 rising pipes.

* * * * *

UNITED STATES PATENT AND TRADEMARK OFFICE
CERTIFICATE OF CORRECTION

PATENT NO. : 4,747,694

DATED : May 31, 1988

INVENTOR(S) : Bror G. Nyman et al

It is certified that error appears in the above-identified patent and that said Letters Patent is hereby corrected as shown below:

Column 1, lines 6 and 7:

"method for dispensing the two phases" should read: --method for dispersing the two phases--.

Column 2, line 4:

"7/8 of the diameter" should read: --1/3 of the diameter--.

Column 2, line 26:

"book, Se Edition" should read: --book, Second Edition--.

Column 5, line 34:

"continuation of the mixed" should read:

--continuation of the mixer--.

Signed and Sealed this

First Day of November, 1988

Attest:

DONALD J. QUIGG

Attesting Officer

Commissioner of Patents and Trademarks